US009167747B1

(12) United States Patent
Andros et al.

(10) Patent No.: US 9,167,747 B1
(45) Date of Patent: Oct. 27, 2015

(54) DEVICE AND SYSTEM FOR CUTTING THE TOPS OF ONIONS AND OTHER BULB CROPS

(71) Applicants:Matthew James Andros, Santa Margarita, CA (US); Garett John Stapp, San Luis Obispo, CA (US); Thomas Klippenstein, Paso Robles, CA (US); Harrison Honerkamp, Paso Robles, CA (US)

(72) Inventors: Matthew James Andros, Santa Margarita, CA (US); Garett John Stapp, San Luis Obispo, CA (US); Thomas Klippenstein, Paso Robles, CA (US); Harrison Honerkamp, Paso Robles, CA (US)

( * ) Notice: Subject to any disclaimer, the term of this patent is extended or adjusted under 35 U.S.C. 154(b) by 0 days.

(21) Appl. No.: 13/899,411

(22) Filed: May 21, 2013

Related U.S. Application Data

(60) Provisional application No. 61/666,699, filed on Jun. 29, 2012.

(51) Int. Cl.
*A01D 23/00* (2006.01)
*A01D 23/04* (2006.01)

(52) U.S. Cl.
CPC .................................. *A01D 23/04* (2013.01)

(58) Field of Classification Search
CPC ....... A01D 34/20; A01D 34/18; A01D 23/04; A01D 33/14; A01D 27/00
USPC ........... 171/11, 13, 17, 20, 23, 25, 31, 40-42, 171/45; 56/327.1, 121.44, 121.45, 121.46, 56/298, 307, 308, 310; 99/636, 639; 460/143, 135
See application file for complete search history.

(56) References Cited

U.S. PATENT DOCUMENTS

| | | | | |
|---|---|---|---|---|
| 2,750,977 A | * | 6/1956 | Vella et al. | 99/637 |
| 4,866,919 A | * | 9/1989 | Brooks | 56/12.9 |
| 5,024,278 A | * | 6/1991 | Shuknecht | 171/17 |
| 5,107,664 A | * | 4/1992 | Ross et al. | 56/121.4 |
| 5,197,549 A | * | 3/1993 | Shuff | 171/17 |
| 5,431,000 A | * | 7/1995 | Shuknecht | 56/308 |
| 5,778,771 A | * | 7/1998 | Heimbuch | 99/637 |
| 6,033,305 A | * | 3/2000 | Perez et al. | 460/99 |
| 6,073,701 A | * | 6/2000 | Kleinemenke | 171/31 |
| 6,484,810 B1 | * | 11/2002 | Bendix et al. | 171/31 |

* cited by examiner

*Primary Examiner* — Robert Pezzuto
(74) *Attorney, Agent, or Firm* — R. Scott Kimsey, Esq.; Klein DeNatale Goldner

(57) ABSTRACT

A device for cutting the tops of crops in a crop bed includes a separator having an inlet, an outlet and an interior space defined between the two. A fan is in fluid communication with the separator and creates an air stream that flows into the separator inlet, through the interior space of the separator, and out the separator outlet. The air stream has an upstream end at or near the separator inlet, where air is pulled into the separator, and a downstream end at or near the fan and continuing beyond. A cutter is positioned upstream of the separator inlet. When the device is in operative position over a crop bed, the air stream lifts the tops of the crops into position to be cut by the cutter. The air stream carries the cut tops away from the crop bed.

19 Claims, 20 Drawing Sheets

DEVICE AND SYSTEM FOR CUTTING THE TOPS OF ONIONS AND OTHER BULB CROPS

RELATED APPLICATIONS

This application claims priority of U.S. Provisional Patent Application No. 61/666,699, filed Jun. 29, 2012 and entitled "Device and System for Harvesting Onions and Other Bulb Crops," and which is incorporated herein by reference in its entirety.

BACKGROUND OF THE INVENTION

1. Field of the Invention

The present invention relates generally to a device for agricultural harvesting, and more specifically to a harvester for onions and other bulb crops.

2. Background

Devices for harvesting bulb crops are known in the art. Known devices suffer from a variety of drawbacks, however, including inadequate cutting of the tops and roots of the bulb crops, as well as damaging the bulb crops during harvesting. It is desirable to cut the onion tops cleanly, and to relatively uniform specifications, a practice traditionally performed by hand. What is needed is a device for efficient cutting of bulb crop tops that is capable of cutting across an entire row of crops in a single pass.

SUMMARY OF THE INVENTION

The present invention relates to a device for cutting the tops of crops in a crop bed. The device includes a separator having an inlet, an outlet and an interior space defined between the two. A fan is in fluid communication with the separator and creates an air stream that flows into the separator inlet, through the interior space of the separator, and out the separator outlet. The air stream has an upstream end at or near the separator inlet, where air is pulled into the separator, and a downstream end at or near the fan and continuing beyond. A cutter is positioned upstream of the separator inlet. When the device is in operative position over a crop bed, the air stream lifts the tops of the crops into position to be cut by the cutter. The air stream carries the cut tops away from the crop bed.

In one embodiment of the invention, the separator has an intake hood attached to the inlet of the separator. The intake hood has an intake hood inlet and defines an interior space within the intake hood. The air stream created by the fan enters the intake hood inlet and travels through the interior space of the intake hood to the separator. The intake hood is adjustable such that the size and shape of the intake hood inlet can be altered.

In another embodiment of the invention, the separator includes a screen positioned in the interior space of the separator. The air stream traveling through the separator passes through the screen, preventing tops within the air stream from reaching the fan.

In another embodiment of the invention, the separator outlet leading to the fan is a fan outlet. The separator also includes a chopper outlet at a rear portion of the separator. The interior space of the separator is shaped such that the air stream propels the cut tops toward the rear portion of the separator. A chopper is attached to the chopper outlet of the separator and is positioned below the chopper outlet so that tops propelled to the rear of the separator fall into the chopper.

In another embodiment of the invention, the device includes an air lock attached to the bottom of the chopper and in fluid communication with the chopper. Tops passing through the chopper fall into the air lock. The air lock includes an air lock inlet, an air lock outlet, and an interior wall extending between the two and defining an air lock interior. A rotor is rotatably positioned within the air lock interior. The rotor includes a number of fins in sealing engagement with the interior wall of the air lock when the rotor rotates such that any given fin is adjacent to the interior wall. The tops are passed through the air lock by rotation of the rotor, without breaking the air tight seal between the air lock inlet and the air lock outlet.

In another embodiment of the invention, the device includes a screw conveyor attached to the air lock and in fluid communication therewith. Tops passing through the air lock fall into the screw conveyor. The screw conveyor includes at least one side outlet positioned to extend over the furrow of the crop bed when the device is in operative position over a crop bed. A rotatable screw extends horizontally along the width of the screw conveyor and is rotatably attached to the screw conveyor. When the rotatable screw rotates, it conveys the tops to the at least one side outlet such that they fall into the crop bed furrow.

In another embodiment of the invention, the cutter includes a first rotatable wheel attached to a first end of the cutter, and a second rotatable wheel attached to a second end of the cutter. A band saw blade engages the first and second rotatable wheel and extends between the two. Rotation of the rotatable wheels results in a corresponding rotation of the band saw blade.

In another embodiment of the invention, the cutter includes a blade scraper fixedly attached to the cutter and positioned in sufficient proximity to either the upper surface of the band saw blade, the lower surface of the band saw blade, or both, to remove debris from the surface of the band saw blade.

In another embodiment of the invention, the cutter includes at least one adjustable, rotatable guide. The guide is in contact with the band saw blade and can be adjusted from side to side, or up and down to raise or lower the height of the band saw blade with respect to the crop bed, or to otherwise adjust the positioning of the blade.

In another embodiment of the invention, the cutter includes a blade tensioner for adjusting the tension of the band saw blade.

In another embodiment of the invention, the height of the device with respect to a crop bed is independently adjustable from side to side. The device can be adjusted so that the first side of the cutter can be set at a different height with respect to the crop bed than the second side of the cutter.

In another embodiment of the invention, the device includes at least one flipper rotatably attached to the device. The flipper is positioned so that it extends partially into the furrow of the crop bed when the device is in operable position over a crop bed. The flipper engages tops that extend into the furrow, and the rotation of the flipper lifts the tops from the furrow and positions them properly for the cutter.

In another embodiment of the invention, the at least one flipper is a conical flipper.

In another embodiment of the invention, the device includes at least one camera. The camera is positioned in view of the interaction between the cutter and the tops. The at least one camera is in communication with a display in view of an operator of the device so that the operator can make adjustments to the device based on what is seen on the display.

In another embodiment of the invention, the separator includes a constriction between the inlet and outlet of the separator. The separator is shaped so that the air stream changes direction between the inlet and the outlet. The rear portion of the interior space of the separator includes an area of reduced air stream velocity. Tops traveling into the separator are accelerated after entering the inlet, and this acceleration propels the tops to the area of reduces air stream velocity as the air stream changes direction to leave the separator.

In another embodiment of the invention, the device includes two gauge wheels attached to the underside of the device so that the device can travel along the length of a crop bed. A steering mechanism is provided for rotating the first and second gauge wheels to allow steering of the device.

DETAILED DESCRIPTION OF THE INVENTION

Figure 1:
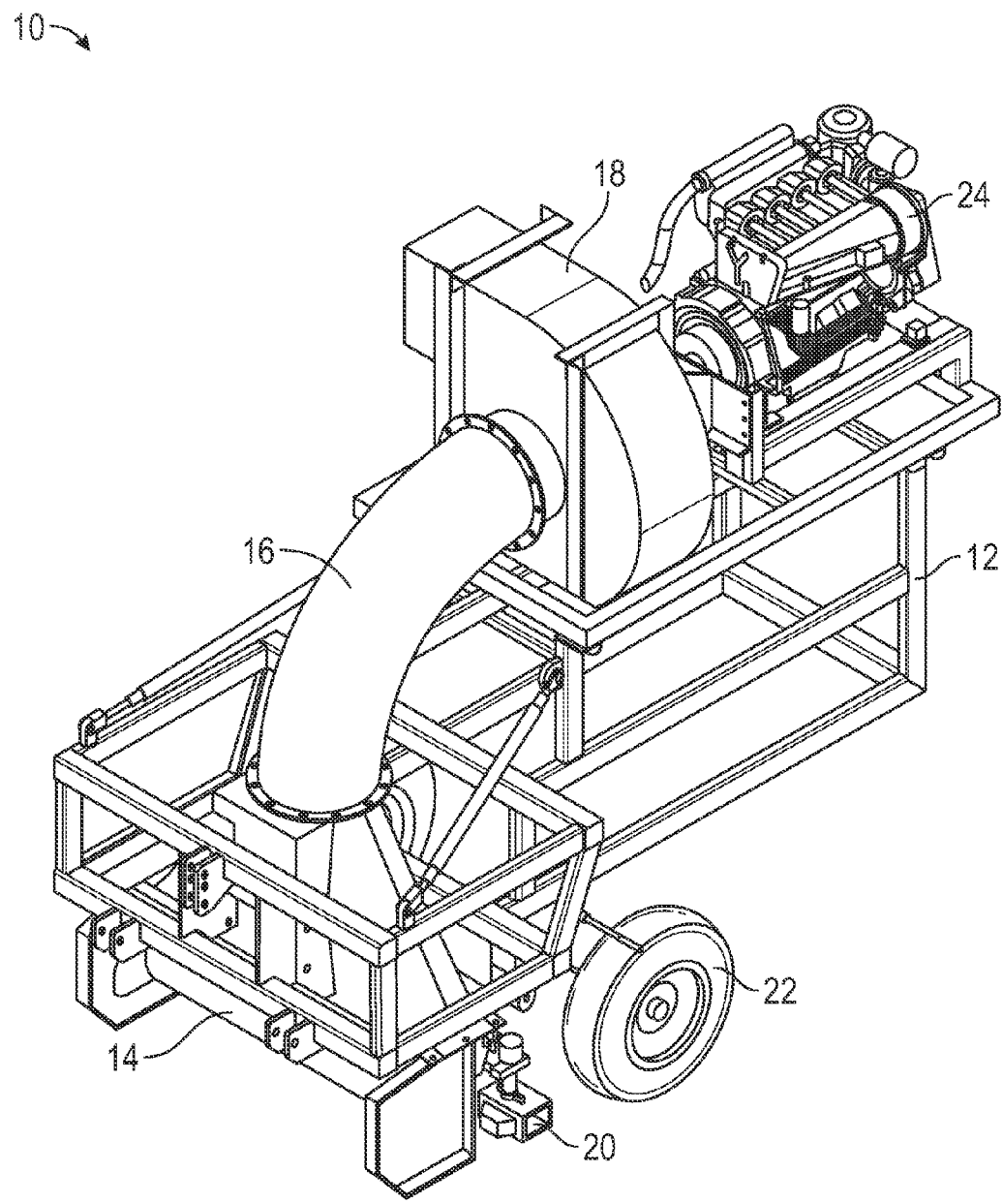
FIG. 1 is a perspective view of one embodiment of a rough topper of the present invention.

Turning now to the drawings, wherein like numerals indicate like parts, FIG. 1 shows one embodiment of a 'rough topper' 10 of the present invention. The device functions to provide a rough cut of the "top" of an onion plant, or other plant. This portion of the plant may be referred to as a stalk or stem, but is generally referred to herein as the "top" of the plant. Further, although the terms "onion" and "onion plant" are used predominantly throughout this writing, it is to be understood that the present invention may be adapted for use with any bulb plants.

Rough topper 10 travels along a field (for example, behind a tractor or other device), cutting the tops of the onion plants as it travels the length of the field. As rough topper 10 travels, gauge wheels 22 ensure that the other components of rough topper 10 remain at the proper height with respect to the field. Fan 18 of rough topper 10 pulls air through adjustable inlet 14 and along elbow 16 before expelling the air into the surrounding environment. The action of fan 18 causes the tops of the onion plants to stand more straight as the device moves over them. Maintaining the tops in this more straight orientation allows sickle bar cutter 20 to more effectively cut the tops of the onion plant, preferably pruning them to four or five inches in height. The material cut from the tops of the onion plants is then pulled through inlet 14, along elbow 16, and expelled through fan 18. The various components of rough topper 10 are affixed to a rigid frame 12 with attachments for attaching rough topper 10 to a tractor or other vehicle.

Figure 2:
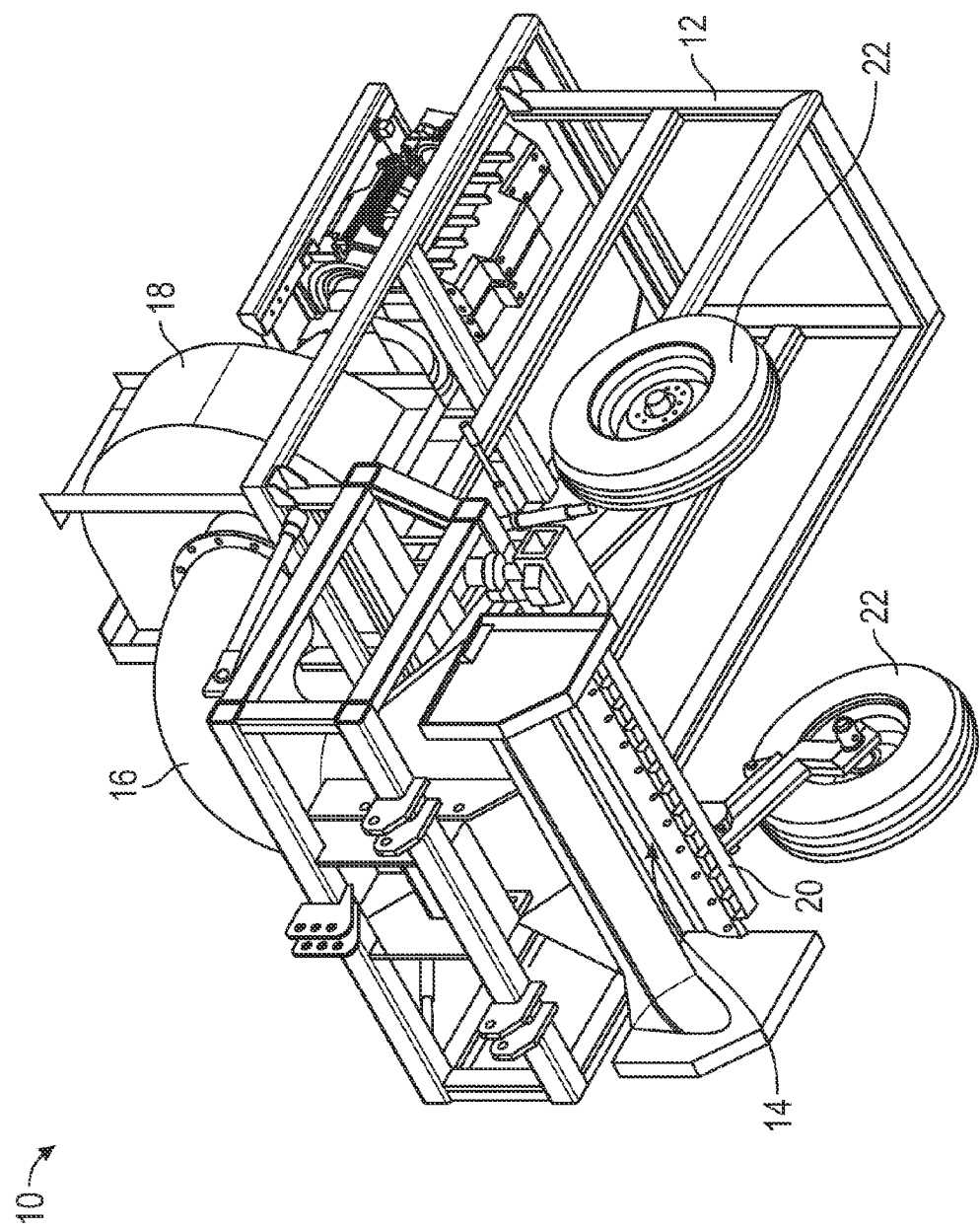
FIG. 2 is a bottom perspective view of one embodiment of a rough topper of the present invention.

FIG. 2 provides another view of rough topper 10, with the underside of the device visible. Rough topper 10 preferably includes a diesel engine 24 to power fan 18, though any suitable power source may be employed.

Figure 3:
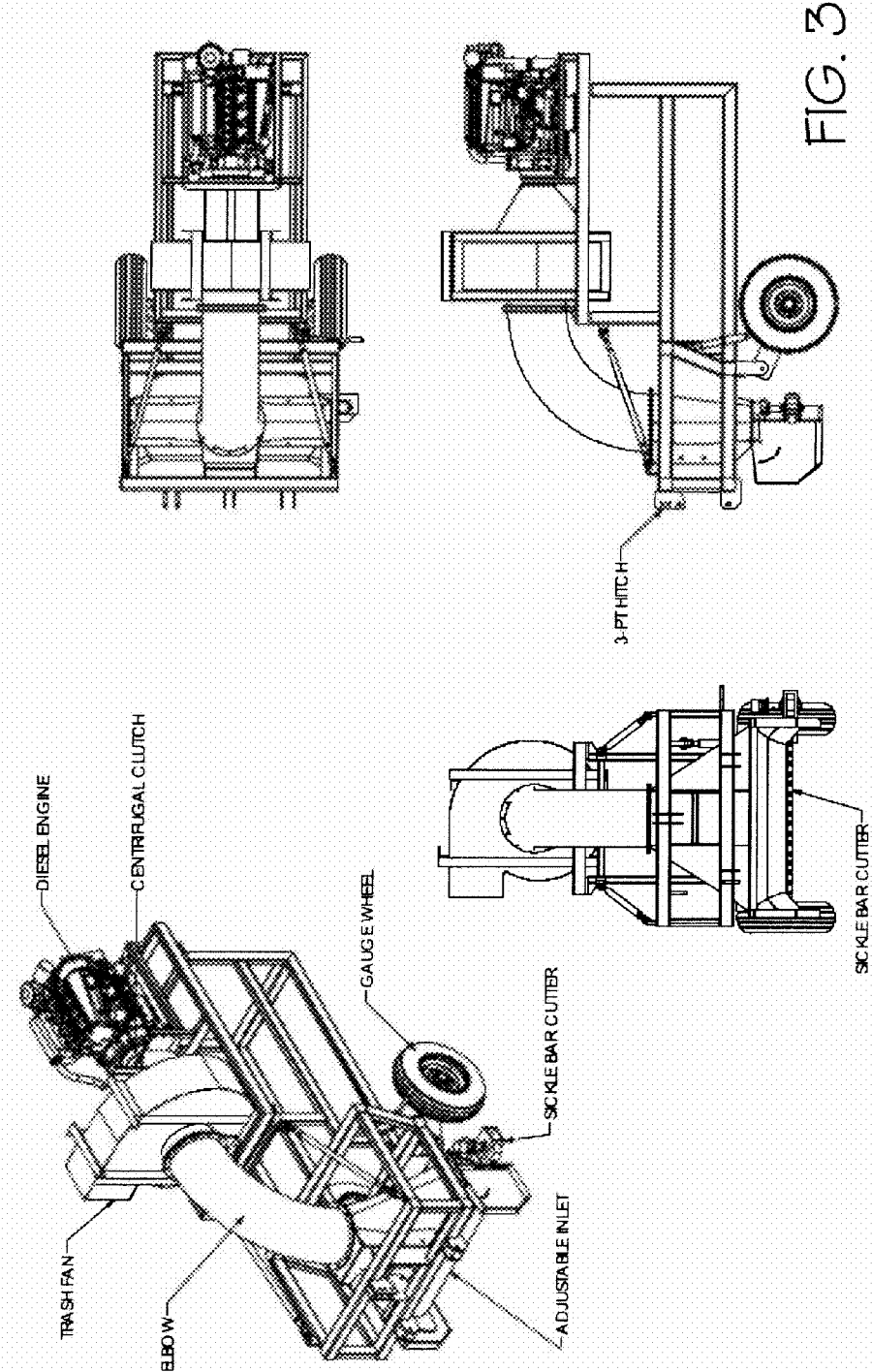
FIG. 3 provides various views of one embodiment of a rough topper of the present invention.

FIG. 3 depicts various other views of rough topper 10, including a view showing a three-point hitch used to attach rough topper 10 to a tractor or other vehicle.

Figure 4:
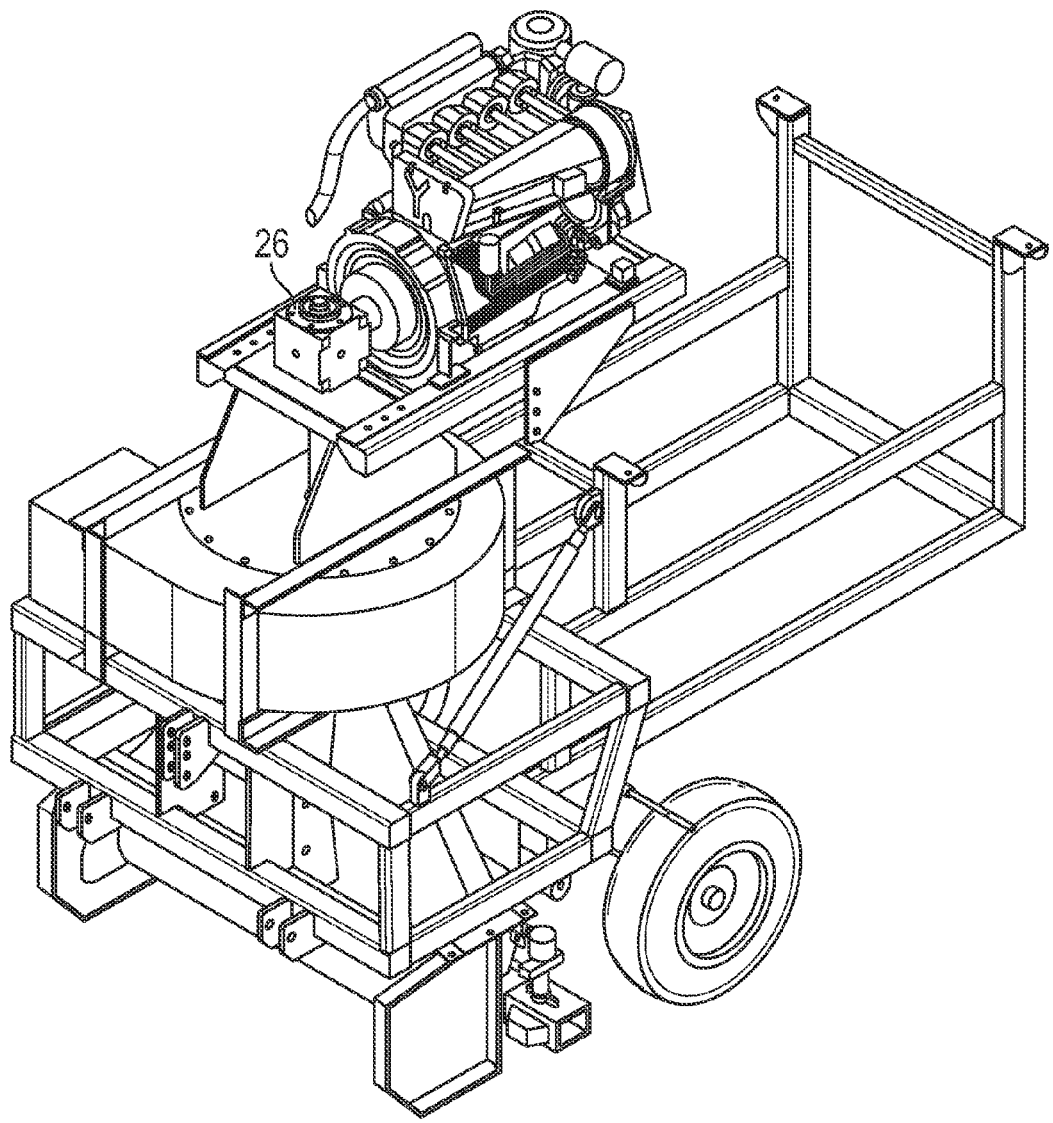
FIG. 4 is a perspective view of one alternative embodiment of a rough topper of the present invention.

FIG. 4 depicts one alternative embodiment of a rough topper of the present invention. The embodiment shown in FIG. 4 includes a gearbox 26. In any of the embodiments of the rough topper of the present invention, any suitable fan or other mechanism to create suction at the inlet may be used.

Figure 5:
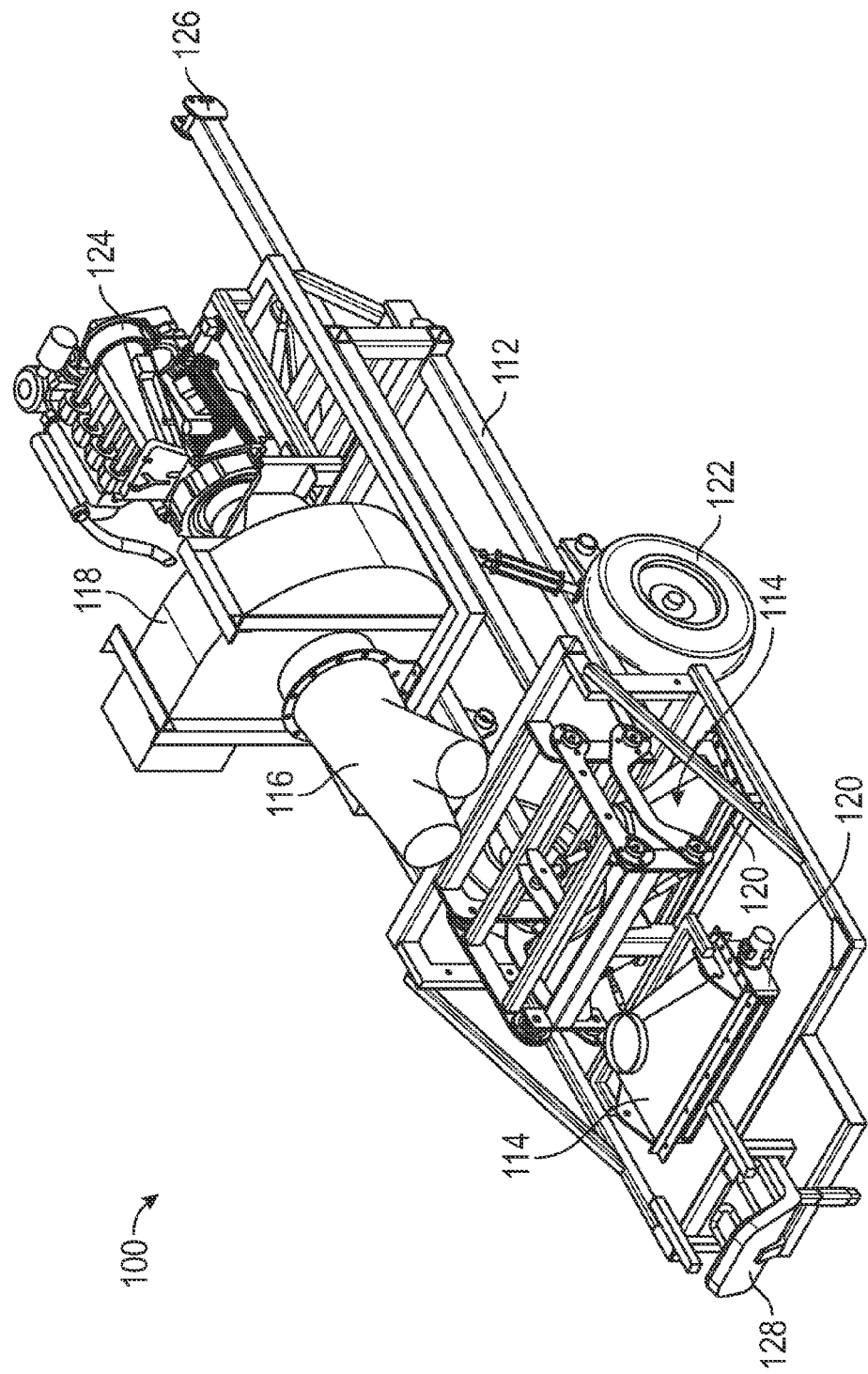
FIG. 5 is a perspective view of one embodiment of a finish topper of the present invention.

FIG. 5 illustrates one embodiment of a finish topper 100 of the present invention. Finish topper 100 includes a frame 112 on which the other components of finish topper 100 are mounted. As finish topper 100 travels along a field, preferably attached to a tractor or other vehicle. Gauge wheels 122 of the finish topper preferably travel along the furrows flanking the bed in which the onions are planted. Controls are provided so that the operator can adjust the cut height of the finish topper, ensuring that the cutting mechanism of finish topper 100 is at the proper height in relation to the onions or other plants in the field.

Figure 6:
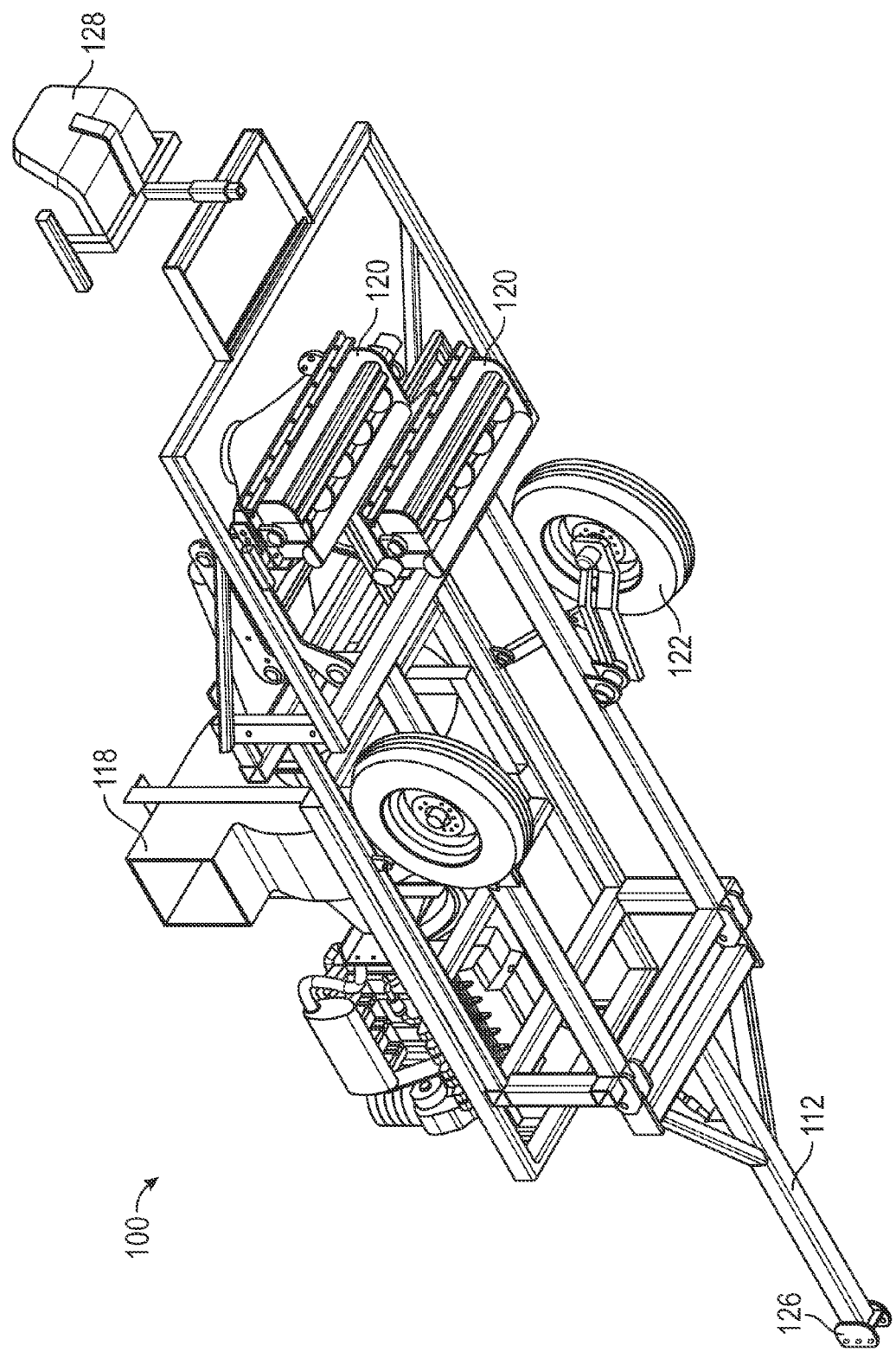
FIG. 6 is a bottom perspective view of one embodiment of a finish topper of the present invention.

As finish topper 100 moves along a field, fan 118 is engaged, creating suction at inlets 114. Due to this suction, the remaining tops of the onion plants (i.e. that portion not cut by the rough topper, described above) are made to stand more straight. Reel cutters 120 pass over the plants, cutting the remaining tops of the onions. The remaining tops cut by reel cutters 120 are pulled into inlets 114, and through an air passage connecting inlets 114 with wye duct 116. The cut tops are then pulled through fan 118, where they are chopped into smaller pieces and expelled into the environment. As with rough topper 10, finish topper 100 includes a diesel engine 124 or other suitable power source for powering fan 118. Also included in some embodiments of finish topper 100 is chair 128, for use by an operator of finish topper 100. A tongue 126 is affixed to or part of frame 112 for attaching finish topper 100 to a tractor or other vehicle. The underside of the embodiment of the finish topper shown in FIG. 5 is depicted in FIG. 6.

It is further contemplated that in some embodiments of finish topper 100, reel cutters 120 may be adjustable to match the shape of the bed containing the crop to be harvested. For example, if the bed is crowned, the reel cutters 120 may be disposed at angles to match the crown of the bed. The general structure of reel cutters such as reel cutters 120 is known in the art. Reel cutters generally include a stationary cutter bar or, as referred to herein, a bed knife. It is contemplated that the angle of the reel cutters may also be adjusted in relation to the bed knife according to the needs or desire of a user of the present device. Further, the bed knife itself may be adjustable and may, for example, be tilted forward for a more aggressive cut, or tilted backward for a less aggressive cut.

Figure 7:
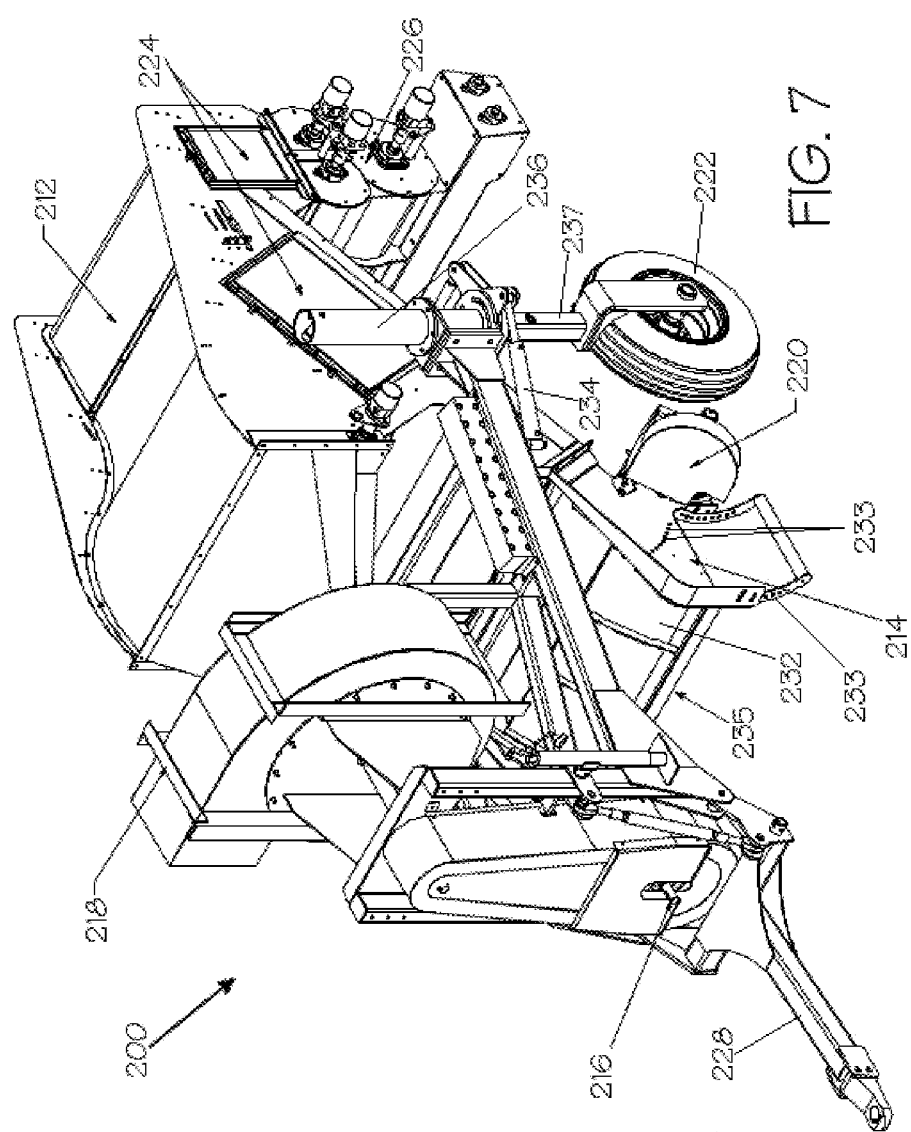
FIG. 7 is a perspective view of one embodiment of an onion topper of the present invention.

FIG. 7 shows an embodiment of an onion topper 200 of the present invention not requiring the two-step process of employing a rough topper followed by a finish topper. Although referred to herein as an "onion" topper, it should be noted that the present device and the principles associated therewith may be applied to cutting the tops of any suitable bulb plant. Onion topper 200 is pulled behind a tractor or other vehicle, to which onion topper 200 is attached via hitch 228.

Onion topper 200 includes fan assembly 218, containing fan 310, powered by the power take off (PTO) of the tractor or other vehicle used to pull onion topper 200. The vehicle PTO drives fan drive 216 via a CV driveshaft (not shown). Fan assembly 218 draws air through intake nozzle assembly 214, the force of the air being drawn therethrough causing the tops of the onions to stand more straight, and also causing the tops to be angled slightly to position the tops for more effective cutting. Intake nozzle assembly 214 includes an intake hood 235 having an adjustable front deflector 232, the position of which can be adjusted in two directions.

The size of the opening in intake hood 235 through which air is drawn can be narrowed or widened by use of a screw, bolt, pin, or the like, positioned at various points along the plurality of openings 233. Though not visible in the drawings, a complementary set of openings are provided on the other side of intake nozzle assembly 214. Front deflector 232 can also be adjusted along the length of intake nozzle assembly 214, extending forward so that front deflector 232 is in closer relation to a bed of onions or related crops, or may be retracted along the length of intake hood assembly 214, such that front deflector 232 is further removed from the crop bed. It may be desirable to position front deflector 232 close to the crop bed when the tops of the crops are relatively short, while relatively long tops may be best cut when front deflector 232 is retracted along the length of intake nozzle assembly 214.

Intake nozzle assembly 214 further includes adjustable side members 230 on either side of air intake hood 235. Adjustable side members 230 are adjustable to better fit with the physical characteristics of the crop bed, to help ensure proper air flow into intake nozzle assembly 214 across a variety of crop beds. By adjusting intake nozzle assembly 214 using the various mechanisms described above, a user of onion topper 200 can adjust the air flow therethrough while maintaining operation fan 310 at a constant speed. The shape of intake nozzle assembly 214 may be adjusted according to characteristics of the crops being cut, the "mattress" of plant material atop the plant bed, characteristics of the soil, and the like, such that the tops will be held in optimal position for cutting and as little other debris as possible enters material separator 212.

The tops of the onions or other crops, having been made to stand more straight by the action of air flowing into intake nozzle assembly 214, are cut by cutter assembly 220. Cutter assembly 220 includes a hydraulically-powered band saw, and is described in more detail below. The severed tops are pulled into material separator 212 The details of the internal structure of material separator 212 are provided, below. Air flow from intake nozzle assembly 214 is accelerated as it moves into material separator 212, and thus the tops and other solid components in the air steam are likewise accelerated. The air stream bends within material separator 212, curving toward fan assembly 218, where the air stream will exit the system. The momentum of the onion tops carries them toward the rear of material separator 212, into a dead space where the air stream is unable to support the tops any further. A continuously-moving screen 238 is provided within material separator 212 to intercept any material that remains in the air steam and attempts to move toward fan assembly 218.

While the air stream bends toward fan assembly 218 and exits onion topper 200, the onion tops that have been carried toward the rear of material separator 212 drop into chopper 226 through the separator's chopper outlet 372 (the chopper outlet being the outlet from the separator and into the chopper). Chopper 226 includes a plurality of rotating blades 244 that chop the tops into smaller pieces. These smaller pieces fall through air lock inlet 374 into airlock 240, which includes a rotor that moves the pieces to the bottom of airlock 240, allowing them to fall through air lock outlet 376 into screw conveyor 242 while maintaining an air tight seal between screw conveyor 242 and material separator 212 by maintaining the seal between the inlet and outlet of the air lock. Screw conveyor 242 uses a rotating action to move the chopped tops to either side of onion topper 200 (depending on the direction of rotation of screw conveyor 242), and allows the tops to fall from either or both of first and second side outlets 378 and 380 of onion topper 200 into the furrow between onion beds. Material separator 212 preferably includes at least one window to allow an operator to view the interior thereof.

In the embodiment of onion topper 200 shown in the figures, fan 310 is located downstream of the material separator outlet 320. The fan 310 pulls air through intake hood 235, through the interior space of material separator 212, and out the fan outlet 320 of material separator 212. It is contemplated that in some embodiments of the invention, however, the fan may be located within the material separator, positioned so as to move air in substantially the same manner as that shown. Any suitable placement of the fan may be used.

Figure 8:
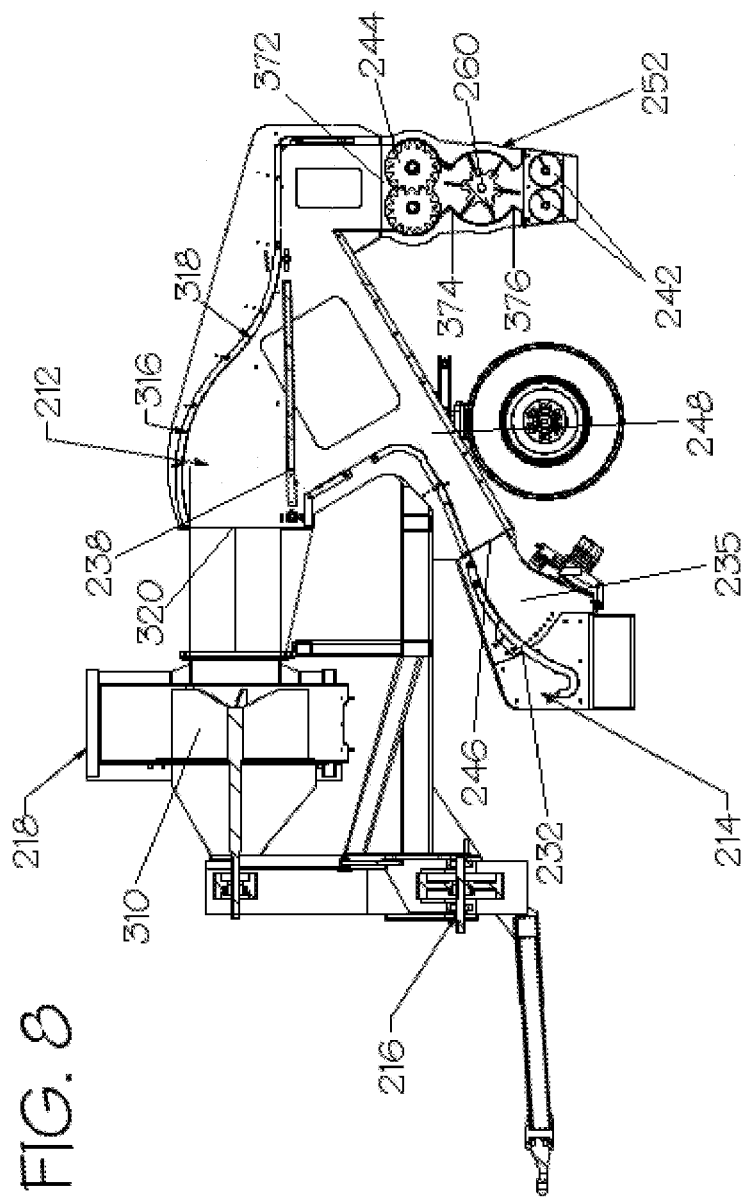
FIG. 8 is a section view of one embodiment of an onion topper of the present invention.

FIG. 8 is a cross-sectional view of onion topper 200, providing a view of the internal structural thereof. The figure shows front deflector 232, and provides a good view of the plurality of openings 233 that allow for up and down adjustment of front deflector 232 in order to make the opening of the intake nozzle assembly larger or smaller, according to the needs or desires of the user. As the airstream and any accompanying matter such as onion tops moves into intake hood 235, the air stream reaches a first constriction 246, where the intake hood attaches to material separator 212. The airway continues to constrict slightly, reaching its narrowest point at second constriction 248 before opening into the larger portion of material separator 212. The effect of these constrictions is to accelerate the air stream, and thus also to accelerate the material traveling within the air stream. By the time the air stream reaches the larger internal space of material separator 212, the onion tops and other solid matter traveling in the air stream has sufficient velocity to be propelled toward the rear of onion topper 200 even though the air stream begins immediately to bend toward fan assembly 218. The opening of material separator 212 into a larger internal space decreases the air velocity so that it is insufficient to stop the momentum of the cut tops toward the back of the device.

When the air steam begins to bend toward fan assembly 218 immediately following second constriction 248, it is possible that a small percentage of the onion tops will be pulled upward by the motion of the air, instead of traveling toward the rear of onion topper 200. A continuously moving screen 238 is provided within material separator 212 to trap those portions of the onion tops that are not carried directly to the rear of onion topper 200. Screen 238 moves in the direction of the rear of onion topper 200, so that onion tops impacting screen 238 are pressed against screen 238 and moved toward the back of the device. As the onion tops reach the rear-most portion of screen 238, they enter the dead zone within material separator 212 and drop from the screen, being carried into chopper 226 along with the bulk of the onion tops.

Figure 9:
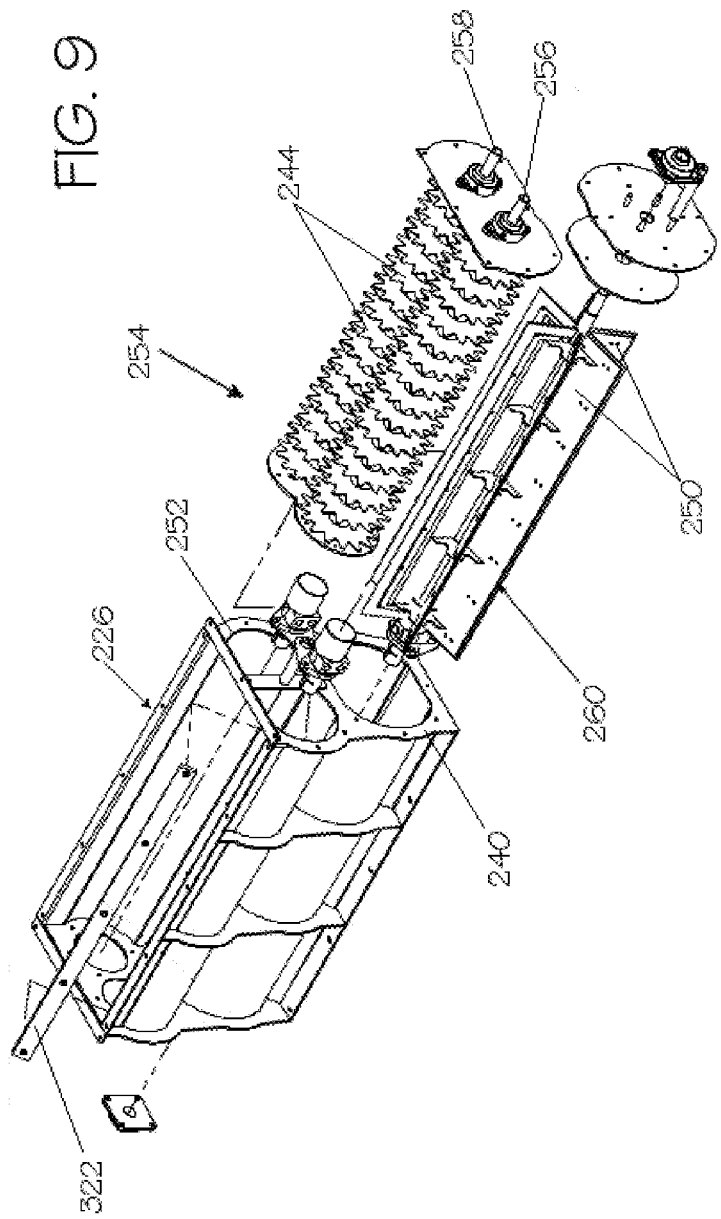
FIG. 9 is an exploded view of one embodiment of a chopper-extractor assembly of the present invention.

FIG. 9 is an exploded view of one embodiment of a chopper-extractor assembly 226 of the present invention. As can be seen in the figure, chopper 254 makes up the upper portion of chopper-extractor assembly 226, while air lock 240 makes up the lower portion. Chopper-extractor assembly 226 includes a housing 252 with an upper compartment for receiving chopper 254 therein. Chopper 254 includes a first shaft 256 and a second shaft 258, each of which has a plurality of blades 244 disposed thereon. During operation of onion topper 200, first shaft 256 and second shaft 258 rotate in opposing directions, each toward the center of chopper-extractor assembly 226. Onion tops falling into chopper-extractor assembly 226 are chopped into smaller pieces by the action of chopper 254. These smaller pieces have an easier time passing through air lock 240, and also decrease the volume of material deposited into the furrow. The smaller pieces will also dry faster in the furrow as compared to full-size onion tops.

As the chopped portions of the onion tops leave chopper 254 they fall into air lock 240. Air lock 240 includes a rotor 260 having a plurality of fins 250, the edge of each of the fins 250 being in air tight relationship to the interior walls of air lock 240. The rotation of rotor 260 allows the chopped pieces of the onion tops to be passed to screw conveyor 242 without disrupting the air flow in material separator 212 and without providing an opening through which fan assembly 218 can pull air. A shear blade 322 present within air lock 240 severs onion tops that rest on or around fins 250 as rotor 260 rotates.

Figure 10:
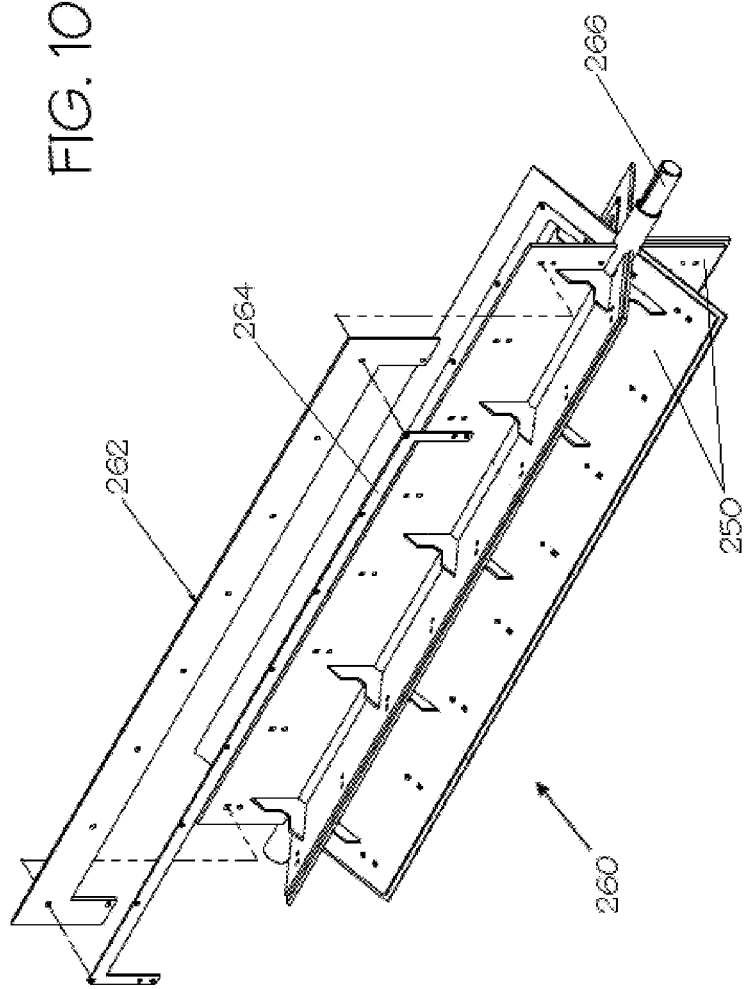
FIG. 10 is an exploded view of one embodiment of an air lock rotor assembly of the present invention.

FIG. 10 provides a more detailed view of rotor 260. As can be seen, fins 250 have seals 262 associated therewith, the seals providing the air tight connection with the interior wall of air lock 240. A seal backing plate 264 is provided to allow seal 262 to be firmly attached to a fin 250. It is contemplated, however, that any suitable structure for sealing rotor 260 may be used. Rotor shaft 266 provides for rotation of rotor 260, thereby moving cut onion top material away from chopper 254 and toward screw conveyor 242.

Figure 11:
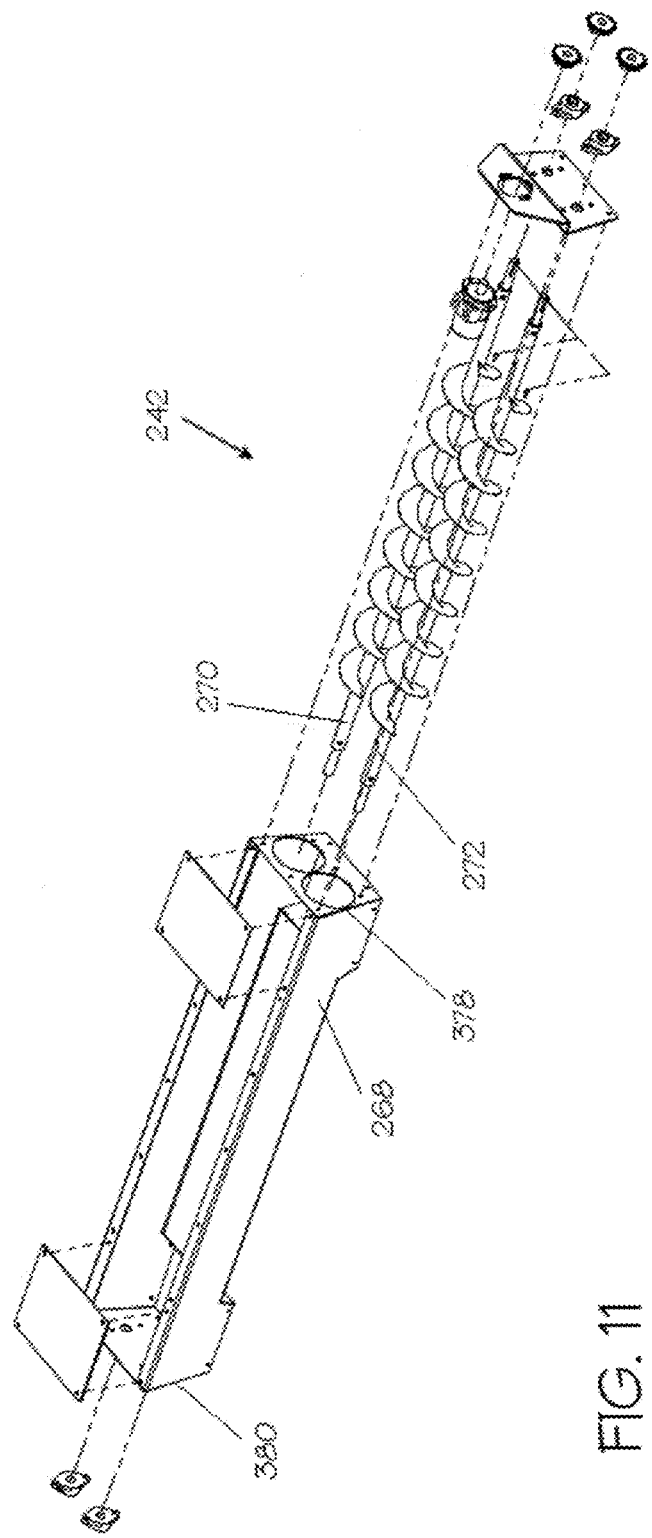
FIG. 11 is an exploded view of one embodiment of a screw conveyor assembly of the present invention.

FIG. 11 provides an exploded view of screw conveyor 242 showing the details thereof. Screw conveyor 242 includes a conveyor housing 268, which is open at the top to receive the pieces of chopped onion tops exiting air lock 240. Within conveyor housing 268 are first screw 270 and second screw 272. During operation of the device, one or both of the screws 270 and 272 may be in operation. The rotational movement of screws 270 and 272 causes movement of the chopped onion top material along the length of screw conveyor 240. Depending on the direction of rotation, onion top material can be directed to one side of onion topper 200 or the other. Alternatively, if each of screws 270 and 272 is rotated in an opposite direction, onion top material may be deposited on both sides of onion topper 200 simultaneously.

Figure 12:
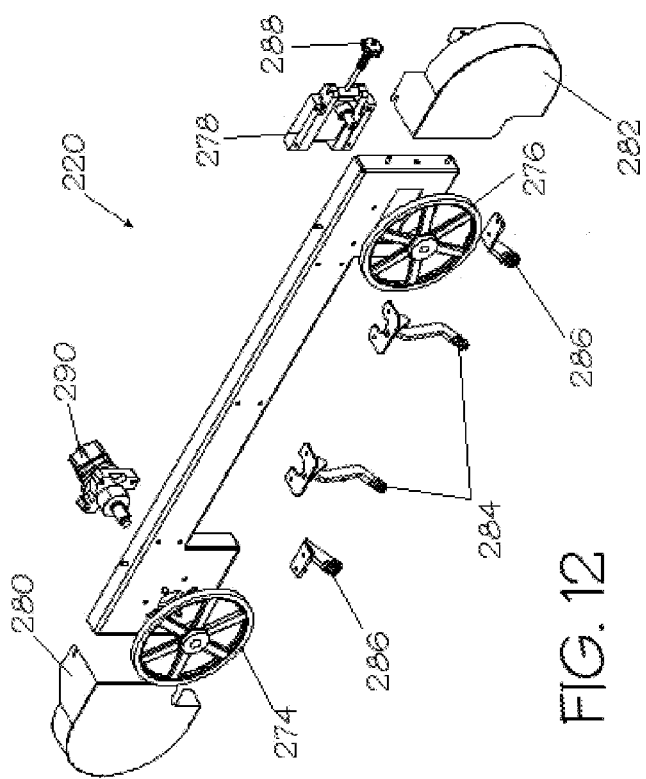
FIG. 12 is an exploded view of one embodiment of a bandsaw assembly of the present invention.

FIG. 12 shows an exploded view of cutter assembly 220. Cutter assembly includes a first cutter wheel 274 and a second cutter wheel 276 on which a flexible band saw blade 314 (shown in other drawings and described in greater detail, below) is mounted. When onion topper 200 is in use, the rotational movement of first cutter wheel 274 and second cutter wheel 276, which may be driven by a single hydraulic motor 290, for example, causes a corresponding movement of the band saw blade, which cuts through onion tops when the blade encounters them as onion topper 200 moves across an onion bed. A blade tensioner 278 is provided, along with an adjustment knob 288, so that a user of the device can adjust the tension of the band saw blade. First and second saw guards 280 and 282 are provided at opposing ends of cutter assembly 220 to protect against injury when onion topper 200 is in use. First cutter wheel 274 and second cutter wheel 276 are preferably offset at an angle with respect to the horizontal plane of band saw blade 314. In the embodiment shown in the figures, first cutter wheel 274 and second cutter wheel 276 are offset at a twenty-five degree angle.

Figure 13:
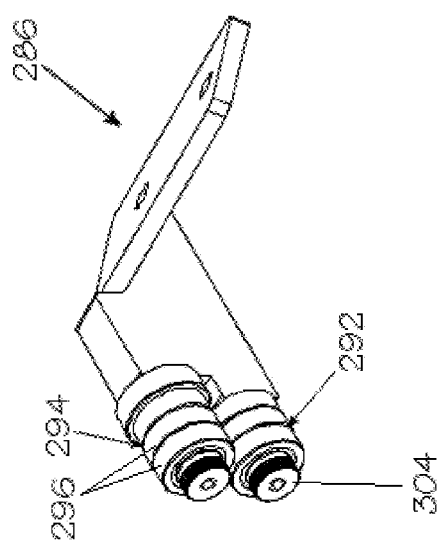
FIG. 13 is a perspective view of one embodiment of a guide roller of the present invention.

Cutter assembly 220 further includes two guide rollers 286 and two center guides 284 to ensure a proper path of travel for the band saw blade. FIG. 13 depicts one embodiment of a guide roller 286 for use with the present invention. The guide roller 286 shown is positioned on the left side of cutter assembly 220 (the term 'left' being based on the perspective of an operator traveling in the direction of onion topper 200). As shown in FIG. 13, guide roller 286 includes a top roller 294 and a bottom roller 292, each of which includes a plurality of bearings 296 that rotate with the motion of the band saw blade.

Figure 14:
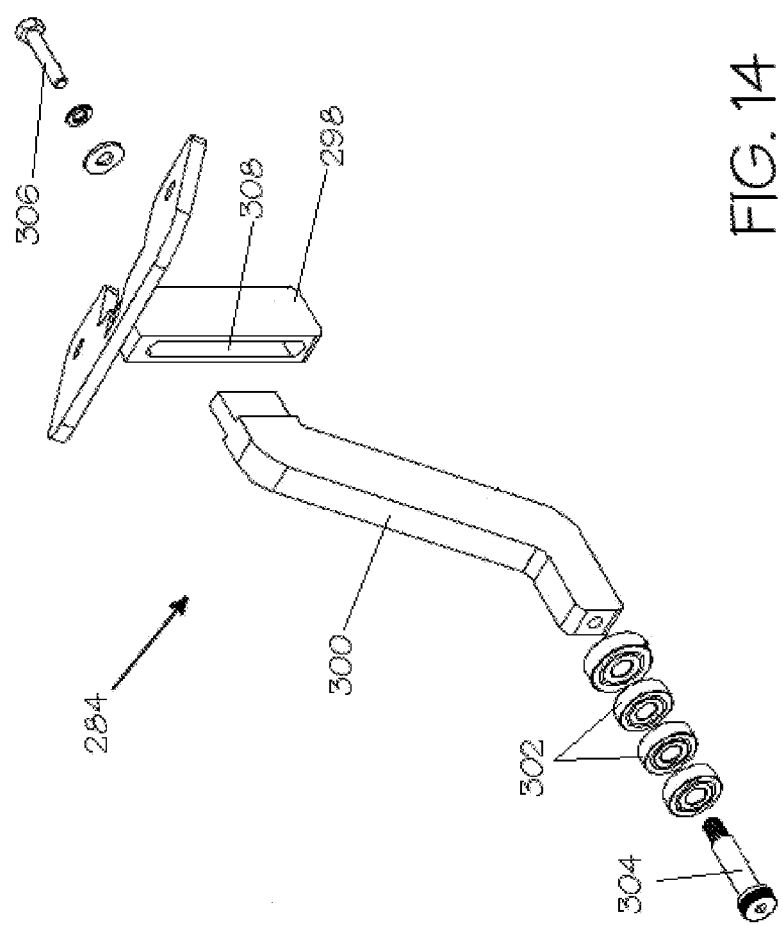
FIG. 14 is an exploded view of one embodiment of a center guide assembly of the present invention.

FIG. 14 shows an exploded view of a center guide 284. Center guide 284 includes a rail 298 that is attached to the cutter assembly 220. The rail has a slot that receives a portion of bar 300. Bar 300 can be moved along the length of slot 308 of rail 298 to allow for variable positioning of center guide 284. As with the guide rollers 286 positioned toward the left and right ends of cutter assembly 220, center guides 284 also include a plurality of bearings 302. Bearings 302 are attached to bar 300 using a shoulder bolt 304. Bar 300 is held in place at the desired location within slot 308 by adjustment screw 306.

Figure 17:
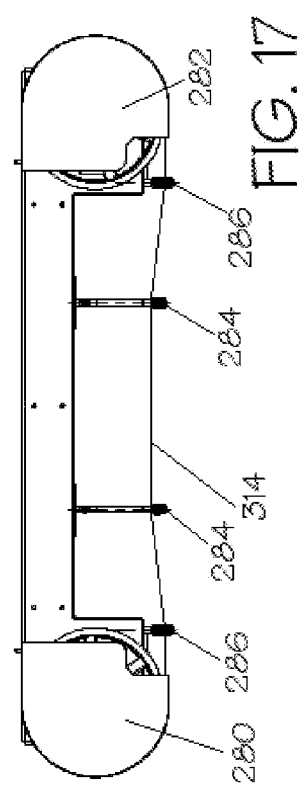
FIG. 17 is a top view of one embodiment of a cutter assembly of the present invention.

As best shown in FIG. 17, guide rollers 286 and center guide 284 define the shape of the blade path for band saw blade 314. Guide rollers 286, positioned toward the outer sides of cutter assembly 220, may be placed slightly lower than the more centrally-positioned center guides 284. This is because the crop bed is crowned, with crops at the edges of the bed positioned slightly lower in the soil than those nearer the center of the bed, and the slight angling of band saw blade 314 allows onion topper 200 to maintain a more consistent cut profile across the width of the device. It should be noted that the relative height of guide rollers 286 and center guides 284 are easily adjusted with respect to one another and also with respect to the crop bed. The side to side position of guide rollers 286 and center guides 284 may also be adjusted. Further, the tension in band saw blade 314 is easily adjusted using adjustment knob 288. Finally, an operator can easily adjust the tracking of band saw blade 314 along the various cutter wheels and guides when necessary.

Some embodiments of cutter assembly 220 may also include blade scrapers to keep dirt and other debris from building up on band saw blade 314 and interfering with the normal operation of onion topper 200. In one embodiment of onion topper 200, the band saw blade scraper includes two spring-steel blades held by adjustable blocks located at the top and bottom sides of band saw blade 314. The adjustable blocks may hold the scraper blades at a forty-five degree angle to band saw blade 314, for example. The adjustable blocks can be loosened, pushed inward toward one another, and then tightened in order to hold the scrapers tight against band saw blade 314. When onion topper 200 is in operation, the tight positioning of the scrapers with respect to band saw blade 314 allows the scrapers to keep both the upper and lower surfaces of band saw blade 314 free of debris.

Figure 18:
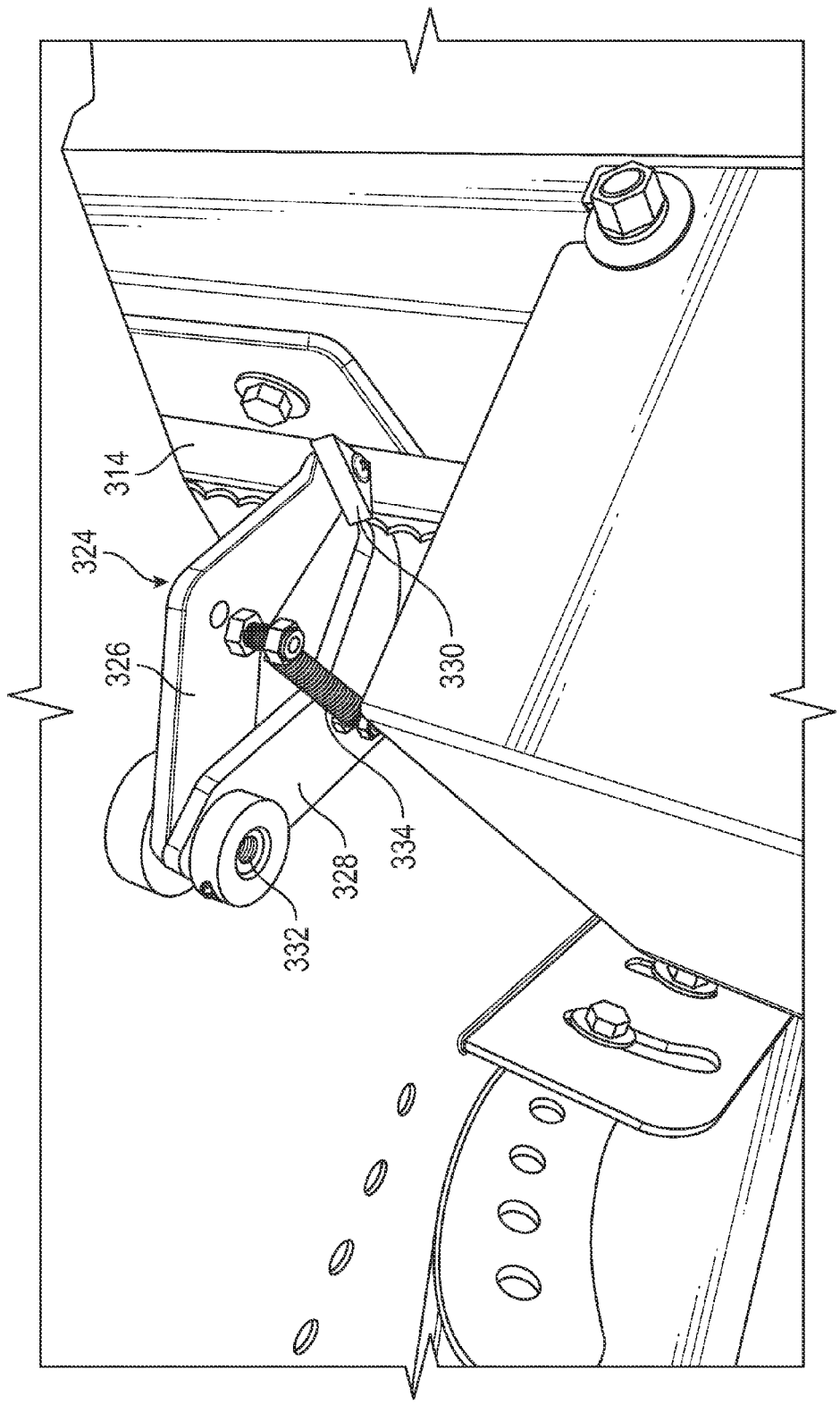
FIG. 18 is a perspective view of one embodiment of a blade scraper of the present invention.

In another embodiment of onion topper 200, a blade scraper such as that shown in FIG. 18 may be utilized. As shown in the figure, blade scraper 324 includes a first arm 326 and a second arm 328, which mirror one another. The end of each of arms 326 and 328 has a carbide insert 330 rotatably attached thereto. The rotation of carbide insert 330 is such that it can match the angle of band saw blade 314. First and second arms 326 and 328 are attached to a pivot 332, and also attached to each other by spring 334. Spring 334 applies even pressure to both of arms 326 and 328 and ensures that the carbide inserts 330 are in constant contact with band saw blade 314. The arms 326 and 328 and the carbide insert 330 attached to each are angled to aid in scraping band saw blade 314 and to direct debris away from the wheels.

Onion topper 200 provides for both steering of the device, and for side to side lateral adjustment, so that the height of cutter assembly 220 can be adjusted as necessary according to the physical conditions of the crop bed. The steering and side to side adjustments can be accomplished by hydraulic or mechanical action, or by a combination of the two. In the embodiment of onion topper 200 shown in the figures, the turning of gauge wheels 222 for purposes of steering is accomplished by hydraulic cylinder 234. In FIG. 7, a hydraulic cylinder 234 is shown in the drawings. It should be noted that a corresponding steering rod (not shown) controls a second gauge wheel 222, which is located on the opposite side of the device from the gauge wheel 222 shown in the figure. The action of hydraulic cylinders 234 is controlled via an operator within the cab of a tractor pulling onion topper 200. The operator can control the steering of gauge wheels 222 independently of the steering of the tractor itself, allowing the operator to make adjustments to the position of onion topper 200 along a crop bed without adjusting the direction of the tractor.

In addition to steering onion topper 200 by adjusting the position of gauge wheels 222, an operator of onion topper 200 can also make side to side, lateral adjustments of onion topper 200, thereby adjusting the position of cutter assembly 220. It should be noted that differential side to side adjustment, such that one side of the device can be raised or lowered independently of the other, allows cutter assembly 220 to be positioned such that it is higher or lower, with respect to onion topper 200 as a whole, on one side versus the other. As shown in FIG. 7, onion topper 200 includes a vertical adjustment cylinder 236. Vertical adjustment cylinder 236 can be actuated by mechanical or hydraulic means, or by a combination of the two. An operator in the cab of a tractor or other vehicle pulling onion topper 200 can raise or lower vertical adjustment cylinder 236 along the length of vertical shaft 237. It will be appreciated from the drawings that when vertical adjustment cylinder 236 is adjusted along the length of vertical shaft 237, the corresponding side of onion topper 200, including cutter assembly 220, is also raised or lowered. Although FIG. 7 only shows one side of onion topper 200, it is to be understood that a corresponding structure is present on the opposite side of onion topper 200 for raising or lowering the opposite side of onion topper 200 in the same manner.

Figure 15:
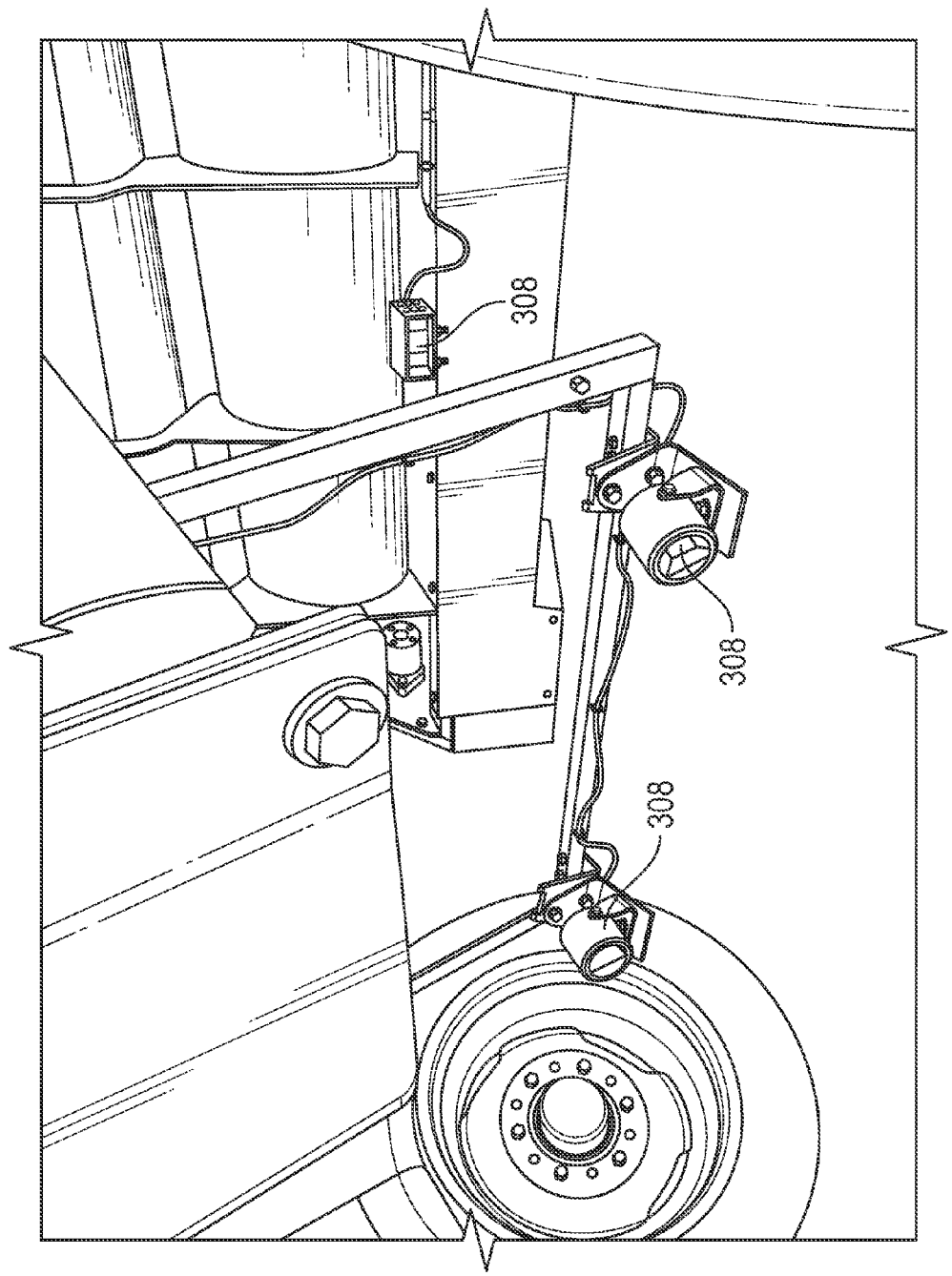
FIG. 15 is a perspective view of exemplary placement of cameras in one embodiment of the present invention.

As can be seen from the drawings, an operator in the cab of a tractor pulling onion topper 200 will not have a good line of sight to gauge wheels 222, and will not be able to see the height of cutter assembly 220 in relation to the crop bed. In order to provide the operator with the information necessary to make adjustments to the steering or height of onion topper 200, cameras 308 are provided at various points along the structure of onion topper 200. As shown in FIG. 15, for example, a camera 308 is provided near the bottom of the chopper-extractor housing 252. Also as shown in the figure, additional cameras 308 are mounted from the underside of material separator 212. Cameras 308 are pointed toward the interior of onion topper 200, thereby being positioned to record the activity of onion topper 200 at the point of cutter assembly 220, and also to provide a view of the position of gauge wheels 222 as onion topper 200 moves along a crop bed. The operator of the device has access to video monitors within the cab of the tractor pulling onion topper 200. The video monitors display in real time the video recorded by cameras 308. It is contemplated that cameras 308 transmit the video image to the monitors in the cab via a wired connection, though in some embodiments of the invention a wireless connection may be provided. Further, in some embodiments of the invention, the operator may be able to make adjustments to the field of view of cameras 308 by pivoting the cameras 308 up and down or side to side using controls within the cab of the tractor. Fewer or more cameras 308 may be provided, and they may be provided in locations other than those shown in the drawings.

Figure 16:
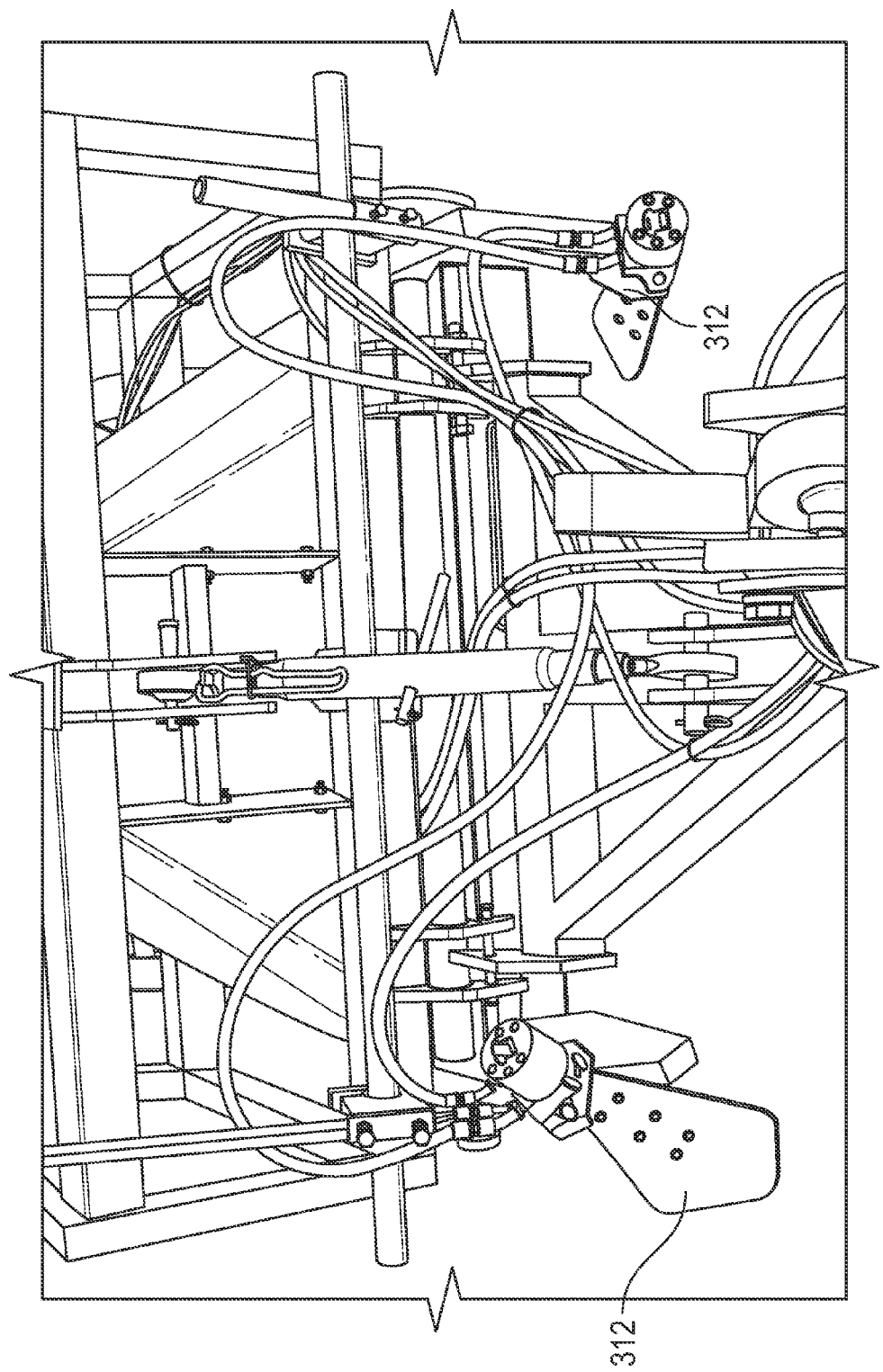
FIG. 16 is a perspective view of one embodiment of rotating flippers of the present invention.

FIG. 16 shows the position of rotating flippers 312, which may be used in some embodiments of onion topper 200. Rotating flippers 312 are positioned on either side of onion topper 200 such that they contact the tops of onions or other crops nearest the furrows flanking the crop bed. These tops are, in some cases, less likely to be made to stand up appropriately by the action of air flow through intake nozzle assembly 214 alone. The action of rotating flippers 312 pushes the tops of the plant up sufficiently for the tops to be caught and held in place by the air flowing into intake nozzle assembly 214. It is contemplated that a variety of shapes and sizes of rotating flippers 312 may be utilized, depending on the conditions of the crop bed, the characteristics of the plants being cut, and the like.

Figure 19:
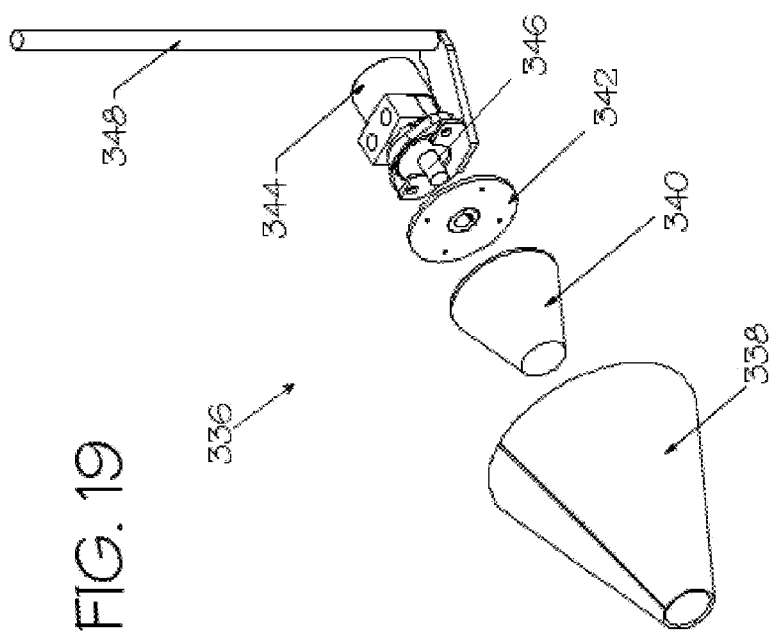
FIG. 19 is an exploded view of one embodiment of a conical flipper of the present invention.

FIG. 19 depicts and exploded view of another embodiment of a flipper suitable for use with the present onion topper 200. Conical flipper 336 rotates to lift onion tops from the furrow so that they can be properly positioned for cutting by band saw blade 314. Conical flipper 336 may be constructed from rubber or other suitable material that will grab the onion tops as it rotates. As shown in the figure, an outer cone 338 is provided for lifting the onion tops. Within outer cone 338, an inner cone 340 is provided, the exterior surface of inner cone 340 engaging the inner surface of outer cone 338 such that when inner cone 340 rotates, there is a corresponding rotation of outer cone 338. A plate 342 is attached to a rear surface of inner cone 340, and the plate 342 includes an opening to receive the shaft 346 of a hydraulic motor 344. The entire assembly is mounted to onion topper 200 via mount 348. In operation, a conical flipper 336 is located on each side of onion topper 200, at roughly the same location as the flippers shown in FIG. 16. The two conical flippers 336 rotate in opposite directions, actuated by separate hydraulic motors, and lift onion tops out of the furrow, positioning them to be grabbed by the air flow into onion topper 200 so they will be available for cutting by band saw blade 314.

Example 1

Certain dimensions and other characteristics of an exemplary embodiment of onion topper 200 are now described. It should be noted that the information provided here, as well as above with respect to the embodiments of the invention shown in the figures, are intended to be exemplary and are not meant to limit the invention.

In the embodiment of onion topper 200 depicted in FIG. 8, second constriction 248 has a width of approximately six inches, providing a choke point for acceleration of the air stream entering material separator 212. The rearward portion of material separator 212 disposed above chopper-extractor housing 252 has a width of approximately 16.2 inches, and constitutes a dead space in which tops cut by the device are not significantly impacted by the air stream flowing through material separator 212. The height of the opening between this rearward portion of material separator 212 and the larger interior space of material separator 212 is approximately 9.7 inches. The curvature of the top of material separator 212 has a first radius at point 316 of approximately thirty inches, the curvature then inverting to a second radius at point 318, also of approximately thirty inches. The height of material separator 212 at exit 320 is approximately 21.4 inches. Band saw blade 314 in the exemplary embodiment is one inch wide and approximately 0.035 inches thick.

The exemplary device described above may be operated at a fan speed of from 1500 to 2000 rpm, and the device itself may travel along the crop bed at a speed of from about 0.5 to about 1.0 mph. It should be noted that any of these speeds may be varied as necessary or desirable depending on characteristics of a specific crop bed and crop.

Figure 20:
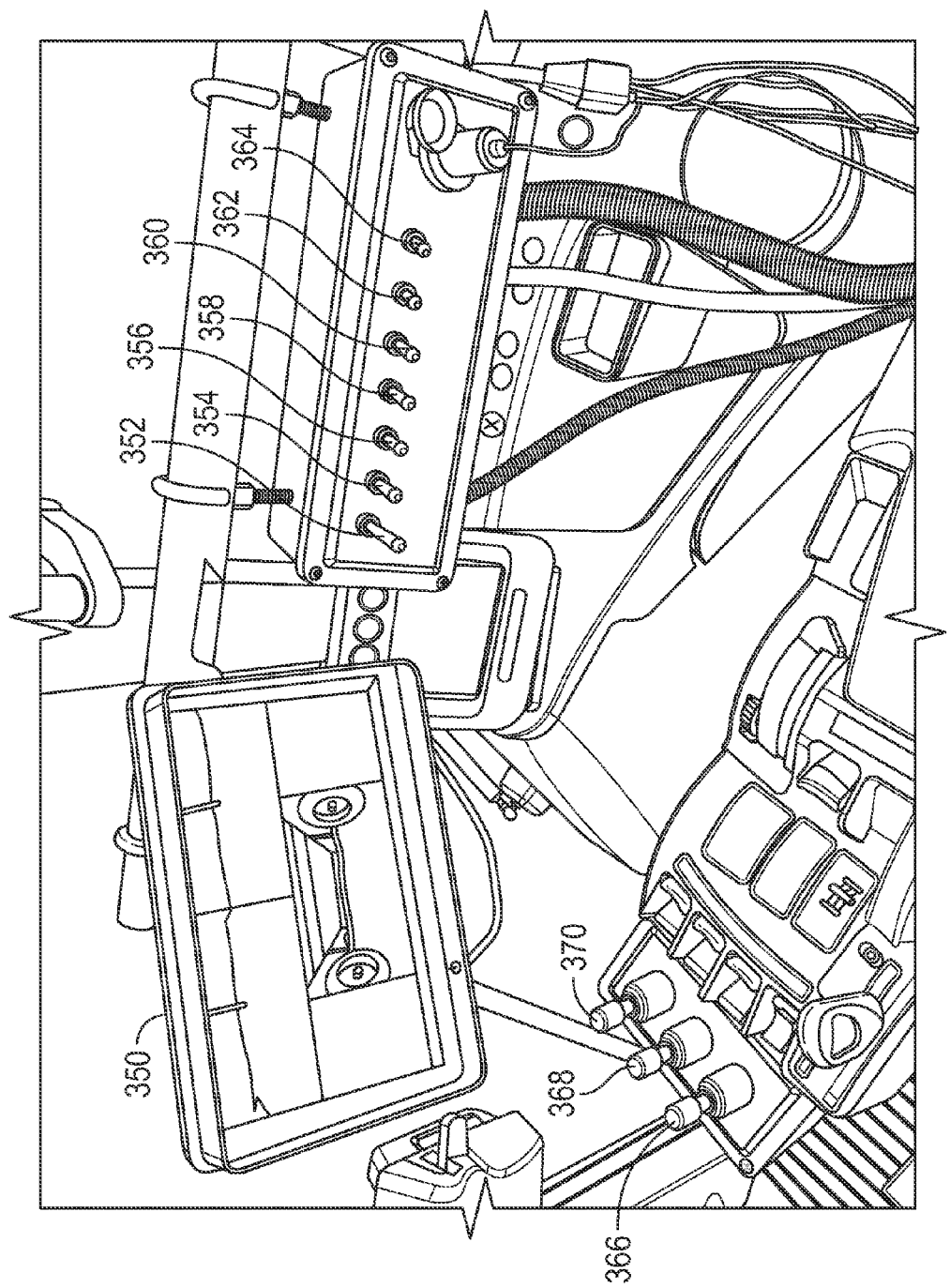
FIG. 20 shows exemplary operator controls for use in one embodiment of the present invention.

FIG. 20 depicts the operator controls for the exemplary device. The controls are provided within a tractor pulling onion topper 200. As can be seen in the figure, a display 350 is provided so that the operator can see the views recorded by various cameras 308. Control switches are provided for operating various components of the system, including a master switch 352, a switch 354 for controlling the band saw blade, a switch 356 for controlling the continuously-moving screen, a switch 358 for controlling the flipper, a switch 360 for controlling the chopper, a switch 362 for controlling the air lock, and a switch 364 for left and right control of the screw conveyor. Steering control 366 is also provided, as is a control 368 for adjusting the height of the left side of onion topper 200, and a control 370 for adjusting the right side of onion topper 200.

Various modifications to the disclosed invention will be readily apparent to those of skill in the art upon reading this disclosure. These are considered within the spirit and scope of the present invention.

The invention claimed is:

1. A device for cutting the tops of crops in a crop bed, the device comprising:
   a support frame;
   a separator attached to the support frame and comprising an inlet and an outlet and defining an interior space therebetween;
   a fan in fluid communication with the separator, the fan creating an air stream flowing into the separator inlet, through the interior space of the separator, and out of the separator outlet; and
   a cutter attached to the support frame upstream of the separator inlet; and
   a vertical adjustment mechanism attached to the support frame for adjusting the height of the cutter relative to a crop bed,
   wherein when the device is in operative position over a crop bed, the air stream lifts the tops of the crops into a position to be cut by the cutter, the air stream then carrying the tops away from the crop bed.

2. The device according to claim 1, wherein the separator further comprises an intake hood attached to the inlet thereof, the intake hood comprising an intake hood inlet and defining an intake hood interior space, the air stream created by the fan entering the intake hood inlet and traveling through the intake hood interior space to the separator, the intake hood being adjustable to change the size and shape of the intake hood inlet.

3. The device according to claim 1 wherein the separator further comprises a screen positioned in the interior space thereof such that the air stream travels through the screen, the screen preventing the tops from reaching the fan.

4. The device according to claim 1 wherein the separator outlet is a fan outlet, the separator further comprising a chopper outlet at a rear portion thereof, and wherein the interior space of the separator is shaped such that the air stream propels the tops toward the rear portion of the separator, the device further comprising:
   a chopper attached to the chopper outlet of the separator and positioned thereunder such that tops propelled to the rear of the separator fall into the chopper by force of gravity.

5. The device according to claim 4, further comprising an air lock attached to a bottom of the chopper and in fluid communication therewith such that tops passing through the chopper fall into the air lock, the air lock comprising:
   an air lock inlet, and air lock outlet, and an interior wall extending therebetween and defining an air lock interior;
   a rotor rotatably positioned in the air lock interior, the rotor comprising a plurality of fins in sealing engagement with the interior wall of the air lock when the rotor rotates, wherein the tops are passed through the air lock by rotation of the rotor without breaking an air tight seal between the air lock inlet and the air lock outlet.

6. The device according to claim 5, further comprising a screw conveyor attached to the air lock outlet and in fluid communication therewith such that tops passing through the air lock fall into the screw conveyor, the screw conveyor comprising:
   at least one side outlet positioned to extend over a furrow of the crop bed then the device is in operative position over a crop bed; and
   a rotatable screw extending horizontally along a width of the screw conveyor and rotatably attached thereto,
   wherein rotation of the rotatable screw conveys tops to the at least one side outlet such that the tops fall into the crop bed furrow.

7. The device according to claim 1, wherein the cutter comprises:
   a first rotatable wheel rotatably attached to a first end thereof;
   a second rotatable wheel rotatably attached to a second end thereof;
   a band saw blade engaging the first rotatable wheel and the second rotatable wheel and extending therebetween, such that rotation of the first rotatable wheel and second rotatable wheel results in a corresponding rotation of the band saw blade.

8. The device according to claim 7, the cutter further comprising a blade scraper fixedly attached thereto and positioned in sufficient proximity to at least one of an upper surface or a lower surface of the band saw blade to remove debris from the respective surface of the band saw blade.

9. The device according to claim 8, wherein the cutter further comprising at least one adjustable rotatable guide attached thereto and in contact with said band saw blade, the adjustable rotatable guide being adjustable in up, down, and side to side directions to adjust the position of the band saw blade with respect to a crop bed.

10. The device according to claim 9, the band saw blade having tension, the cutter further comprising a blade tensioner attached thereto for adjusting the tension of the band saw blade.

11. The device according to claim 1, wherein the height of the device with respect to the crop bed is independently adjustable from side to side such that a first side of the cutter can be set at a different height with respect to the crop bed than a second side of the cutter.

12. The device according to claim 1, further comprising at least one flipper rotatably attached to the device and positioned such that the flipper extends partially into a furrow of the crop bed when the device is in operative position over a crop bed, wherein the flipper engages tops extending into the furrow such that rotation of the flipper lifts tops from the furrow and positions them for cutting by the cutter.

13. The device according to claim 12 wherein the at least one flipper is a conical flipper.

14. The device according to claim 1, further comprising at least one camera attached thereto and positioned in view of the interaction between the cutter and the tops, the at least one camera in communication with a display viewable by an operator of said device.

15. The device according to claim 1, wherein the separator further comprises:
   a constriction between the inlet and the outlet, the constriction accelerating the velocity of the air stream traveling through the separator, the separator shaped such that the air stream changes direction between the inlet and the outlet; and
   an area of reduced air stream velocity at a rear portion of the interior space thereof,
   such that tops traveling into the separator are accelerated after entering the inlet, the acceleration propelling the tops to the area of reduced air stream velocity as the air stream changes direction to leave the separator via the outlet.

16. The device according to claim 1, further comprising:
   first and second gauge wheels attached to an underside of the device such that the device can travel along a crop bed; and
   a steering mechanism for rotating said first and second gauge wheels to allow steering of the device.

17. The device according to claim 1, wherein the support frame comprises a first side and a second, opposing side, and further wherein the vertical adjustment mechanism is a first vertical adjustment mechanism attached to the first side of the support frame, the device further comprising a second vertical adjustment mechanism attached to the second side of the support frame, the first and second vertical adjustment mechanisms being independently operable to adjust the tilt of the device.

18. A device for cutting the tops of crops in a crop bed, the device comprising:
   a support frame;
   a separator attached to the support frame and comprising a separator inlet, a separator outlet, and a cutter outlet, and defining an interior space therebetween, the interior space comprising a constriction between the separator inlet and the separator outlet to accelerate the velocity of an air stream flowing through the separator, the separator inlet and separator outlet positioned such that the air stream changes direction between the separator inlet and the separator outlet, the interior space further comprising an area of reduced air velocity at a rear portion of the interior space, the cutter outlet being therebeneath;
   an intake hood attached to the separator inlet, the intake hood comprising an intake hood inlet and defining an intake hood interior space in fluid communication with the interior space of the separator, wherein the intake hood inlet is adjustable in size and shape;
   a fan in fluid communication with the separator and creating an air stream flowing into the intake hood inlet at an upstream end of the air stream and out of the separator outlet at a downstream end of the air stream;
   a cutter comprising a band saw blade, the cutter attached to the device such that the band saw blade is positioned upstream of the intake hood inlet;
   a rotating screen attached to the separator and positioned within the interior space thereof, the rotating screen positioned between the separator inlet and the separator outlet such that the air stream passes therethrough;
   a chopper attached to the cutter outlet, the chopper comprising a plurality of rotating blades; and
   a vertical adjustment mechanism attached to the support frame for adjusting the height of the cutter relative to a crop bed,
   wherein the air stream generated by the fan and entering the intake hood inlet lifts one or more tops of a crop bed, wherein the cutter cuts the lifted tops and the air stream carries the tops into the separator, and wherein the tops are propelled to the rear of the separator and fall into the chopper.

19. The device according to claim 18, wherein the support frame comprises a first side and a second, opposing side, and further wherein the vertical adjustment mechanism is a first vertical adjustment mechanism attached to the first side of the support frame, the device further comprising a second vertical adjustment mechanism attached to the second side of the support frame, the first and second vertical adjustment mechanisms being independently operable to adjust the tilt of the device.

\* \* \* \* \*